Aug. 19, 1958     F. A. RUSCIANO     2,848,207
APPARATUS FOR THE SCALE FREE HEATING OF METALS
Filed Sept. 15, 1955     6 Sheets-Sheet 1
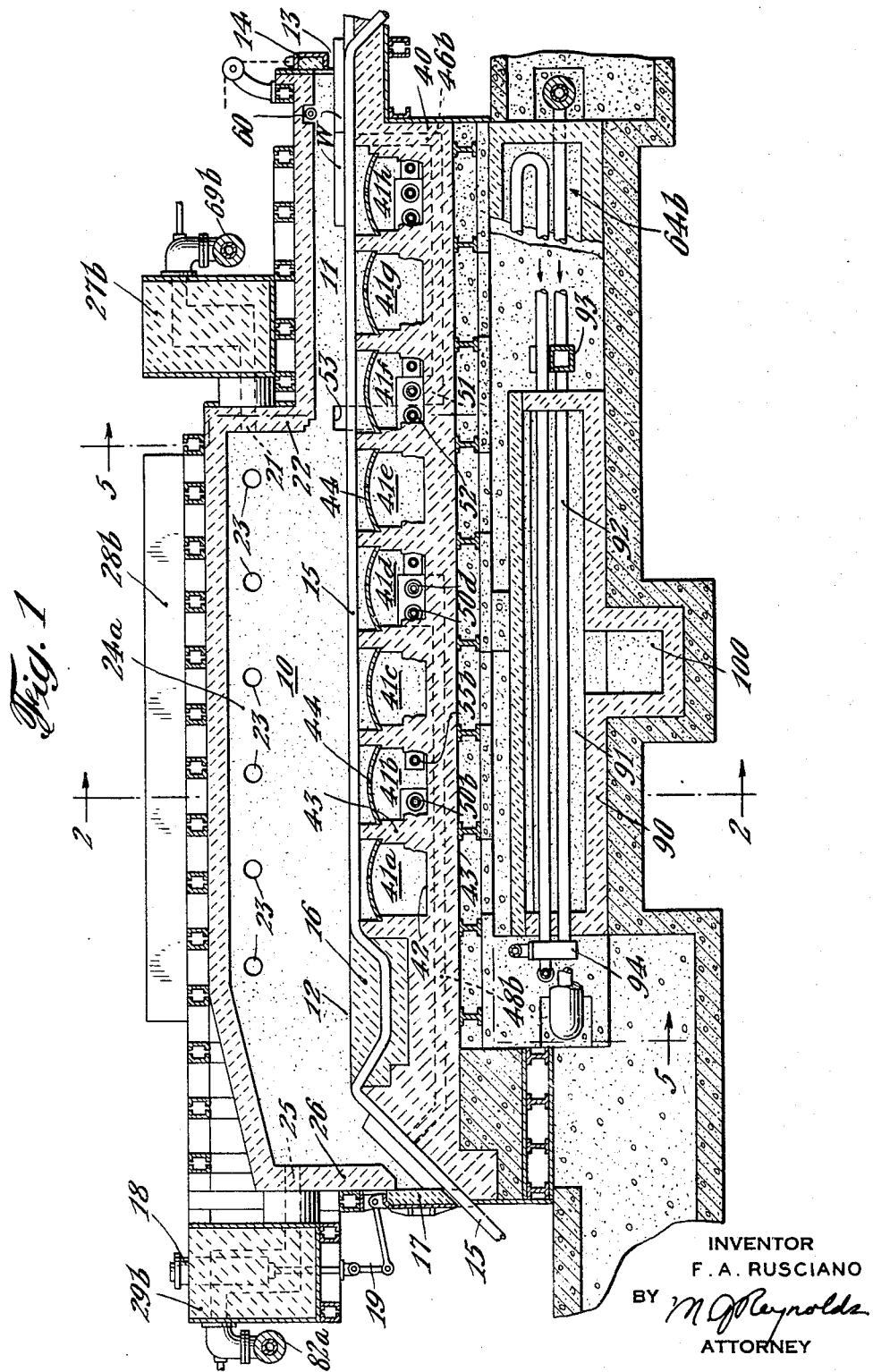
INVENTOR
F. A. RUSCIANO
BY M. J. Reynolds
ATTORNEY Aug. 19, 1958 F. A. RUSCIANO 2,848,207
APPARATUS FOR THE SCALE FREE HEATING OF METALS
Filed Sept. 15, 1955 6 Sheets-Sheet 2
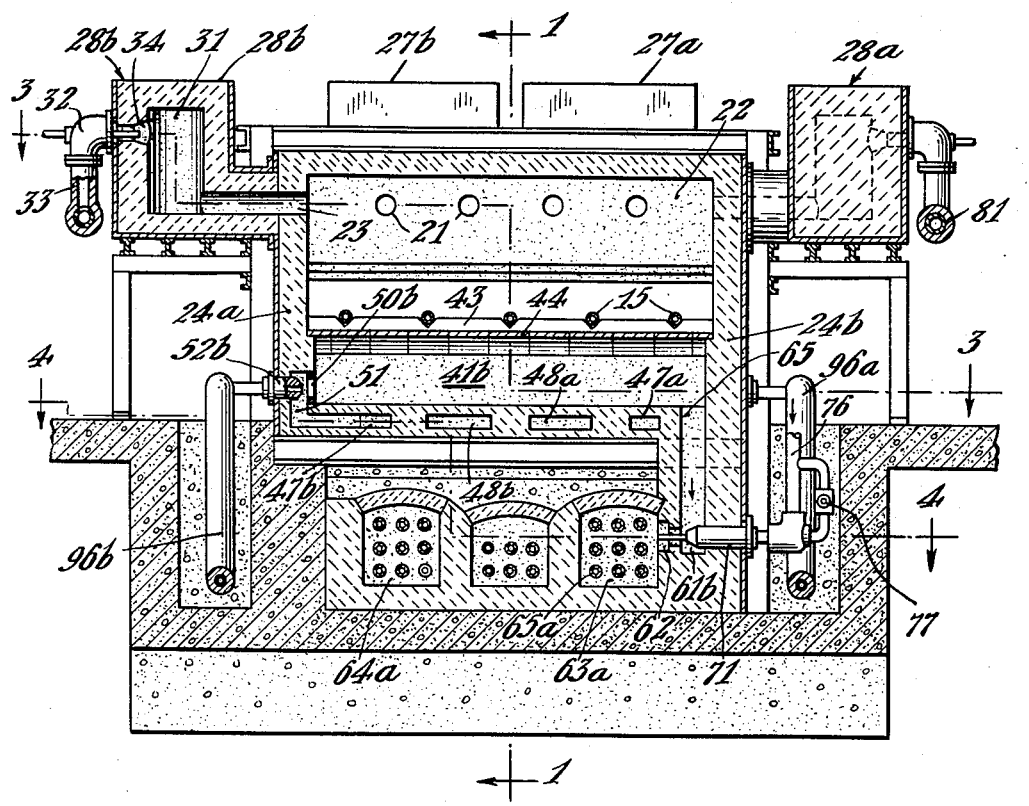
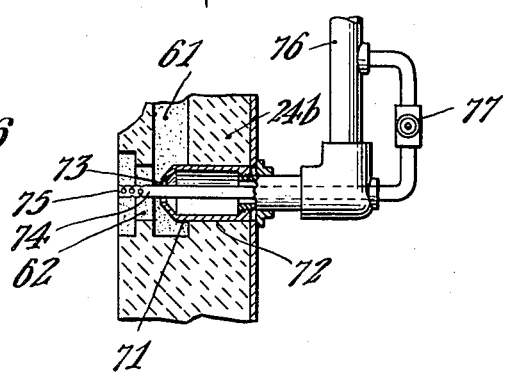
INVENTOR
F. A. RUSCIANO
BY M. J. Reynolds
ATTORNEY Aug. 19, 1958  F. A. RUSCIANO  2,848,207
APPARATUS FOR THE SCALE FREE HEATING OF METALS
Filed Sept. 15, 1955  6 Sheets-Sheet 3

INVENTOR
F. A. RUSCIANO
BY M. J. Reynolds
ATTORNEY

Aug. 19, 1958  F. A. RUSCIANO  2,848,207
APPARATUS FOR THE SCALE FREE HEATING OF METALS
Filed Sept. 15, 1955  6 Sheets-Sheet 4
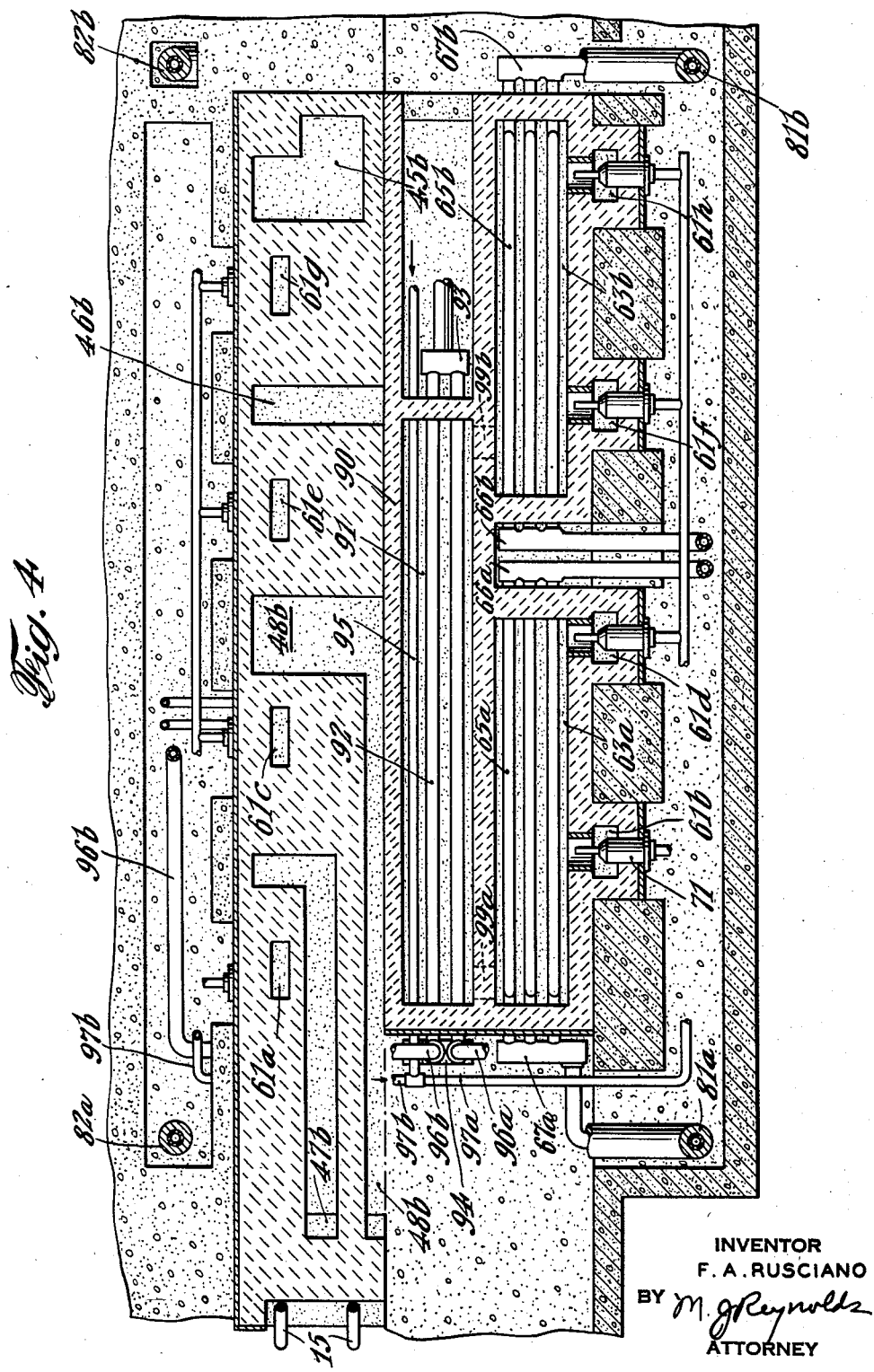
INVENTOR
F. A. RUSCIANO
BY M. J. Reynolds
ATTORNEY Aug. 19, 1958  F. A. RUSCIANO  2,848,207
APPARATUS FOR THE SCALE FREE HEATING OF METALS
Filed Sept. 15, 1955  6 Sheets-Sheet 5
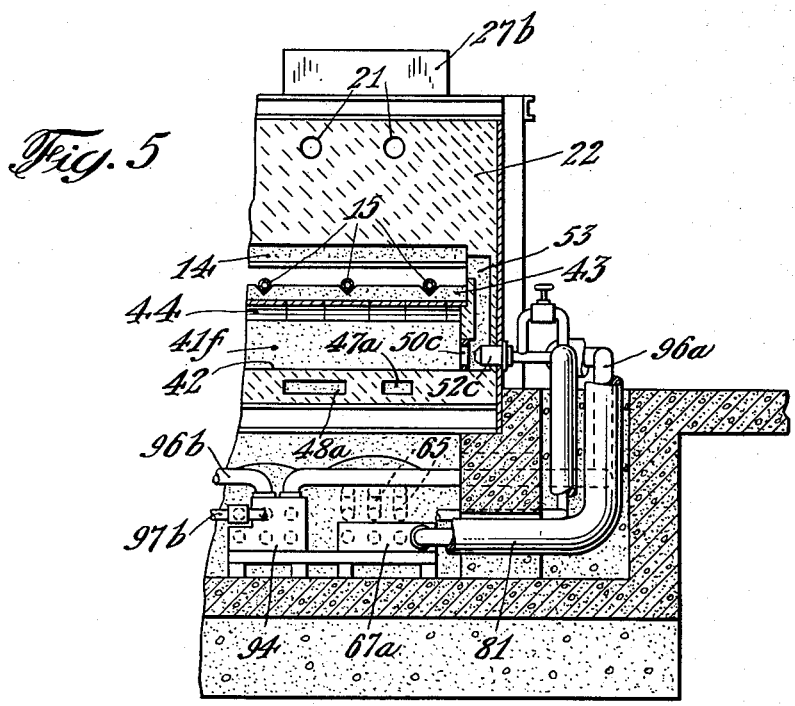
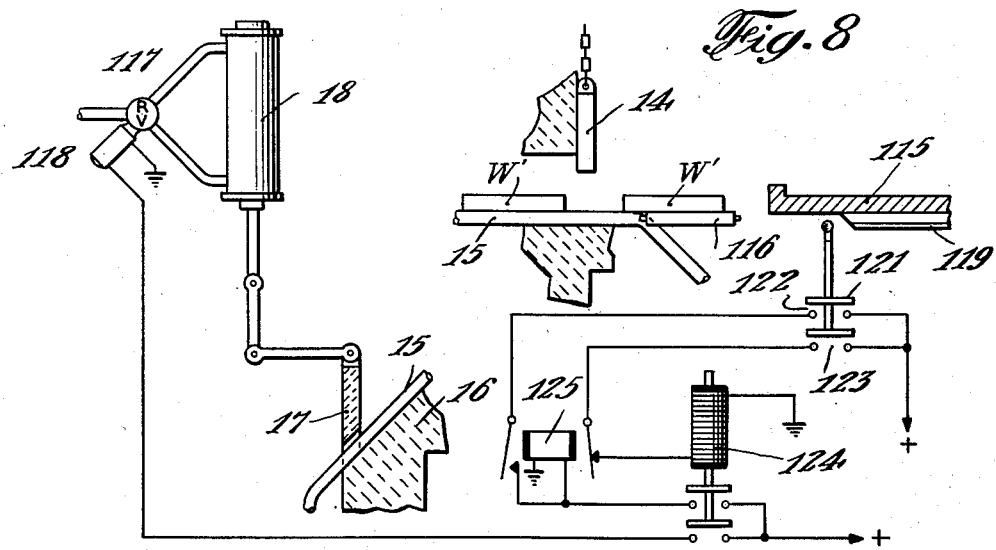
INVENTOR
F. A. RUSCIANO
BY M. J. Reynolds
ATTORNEY

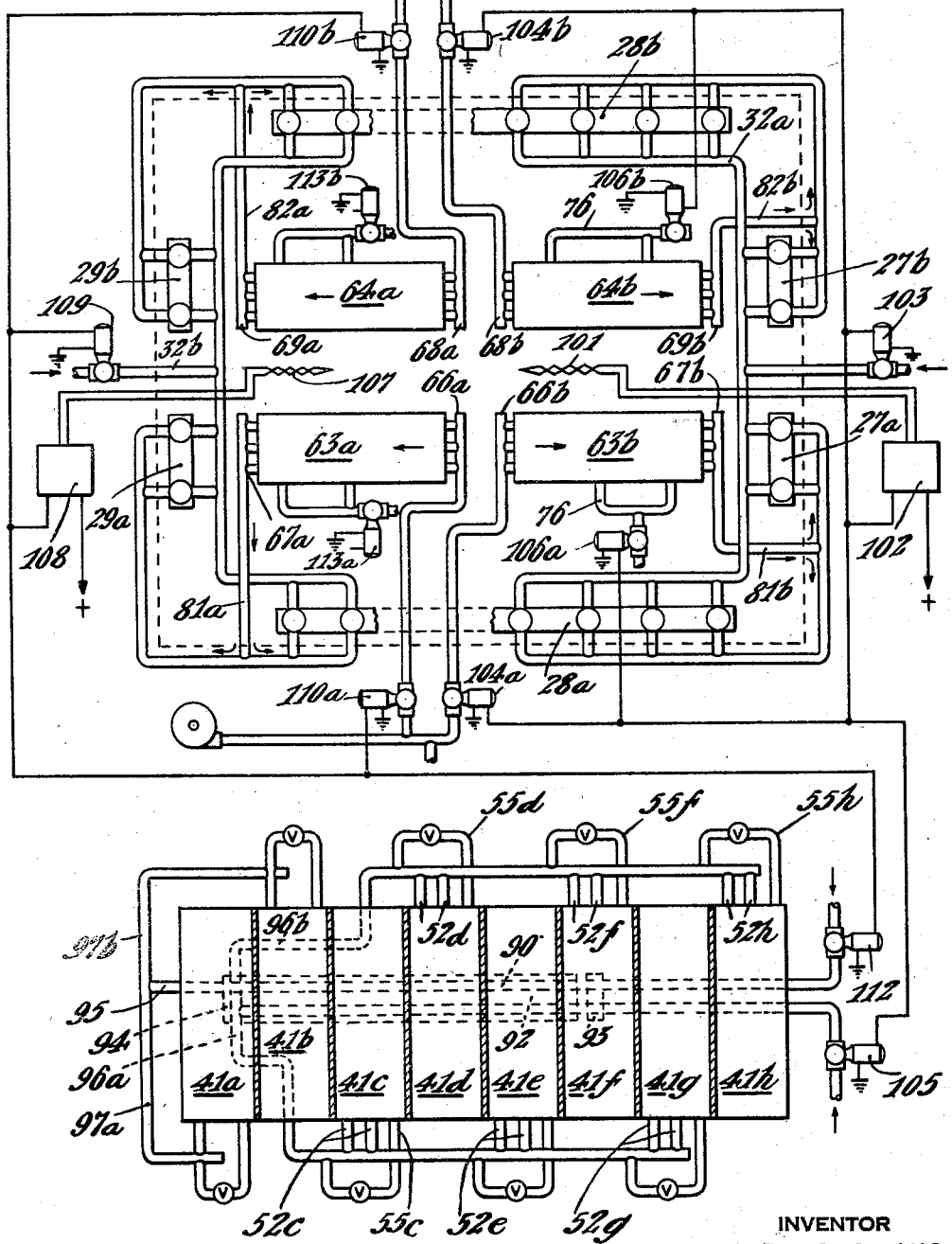

United States Patent Office 2,848,207
Patented Aug. 19, 1958

2,848,207

APPARATUS FOR THE SCALE FREE HEATING OF METALS

Frank A. Rusciano, New York, N. Y., assignor to Metallurgical Processes Co., Newark, N. J., a corporation of New Jersey Application September 15, 1955, Serial No. 534,587

6 Claims. (Cl. 263—15)

This invention relates to the scale free heating of metals in the products of combustion of the heat producing fuel and more particularly to an industrial furnace for such purpose.

The invention is directed to a furnace of the type in which the work to be heated is surrounded by partial products of a primary combustion which are non-scaling in nature and which supply a portion of the heating energy, said products being removed from contact with the work and burned to completion by secondary combustion in direct heat transfer relation with the work but out of physical contact therewith, whereby to supply additional heat to the work. A furnace of this type is disclosed in the copending application of H. J. Ness and the present applicant, Serial No. 255,774, filed November 10, 1951, now Patent No. 2,763,476, and entitled Two Stage Combustion Furnace. In said copending application the secondary combustion occurs in an arched chamber disposed above the work heating chamber, the two chambers being separated by a relatively thin arch of good heat conducting materials. Such construction has proven highly satisfactory in both batch and continuous furnaces of a width in which self-sustaining arches may be satisfactorily employed.

An object of the present invention is to provide a furnace of this two stage combustion type in which the width of the working chamber is unrestricted by structural limitation.

A further object is to provide a two stage combustion furnace which is efficient in operation and suitable for large production at high heating temperatures and rates.

Still another object is to provide a heating furnace in which both the primary combustion and the secondary combustion are completed at high temperatures and out of contact with the work.

A still further object is to provide a continuous heating furnace of a novel design in which the secondary combustion occurs beneath the hearth.

Another object is to complete the primary combustion in a plurality of small combustion chambers disposed externally of the work heating chamber arranged so that a relatively small volume of completely stabilized primary combustion products may be produced in each.

A further object is to provide a plurality of secondary combustion chambers disposed externally of the work heating chamber and in heat transfer relation thereto and suitable means for venting the work chamber atmosphere and distributing said vented atmosphere to said secondary combustion chambers.

Still another object is to provide means for utilizing said vented work chamber atmosphere for preventing entrance of atmospheric air into said heating chamber.

Another object is to provide a furnace having means for recouping the heat from the secondary combustion chambers and utilizing the same to elevate the temperature of both the primary and secondary combustion.

Other objects and advantages will hereinafter appear.

The invention will best be understood by reference to the accompanying drawings in which:

Fig. 1 is a vertical sectional view taken longitudinally through the center of the furnace substantially on the line 1—1 of Fig. 2;

Fig. 2 is a transverse sectional view on the line 2—2 of Fig. 1;

Fig. 4 is a horizontal sectional view on the offset line 4—4 of Fig. 2;

Fig. 5 is a partial transverse sectional view on the line 5—5 of Fig. 1;

Fig. 6 is a detail sectional view of a recuperator air injection nozzle;

Fig. 7 is a diagrammatic view of the air and fuel conduits showing the air preheating, zoning and supply control arrangements, and;

Fig. 8 is a diagrammatic view of the discharge door opening and control mechanism.

Figure 3:
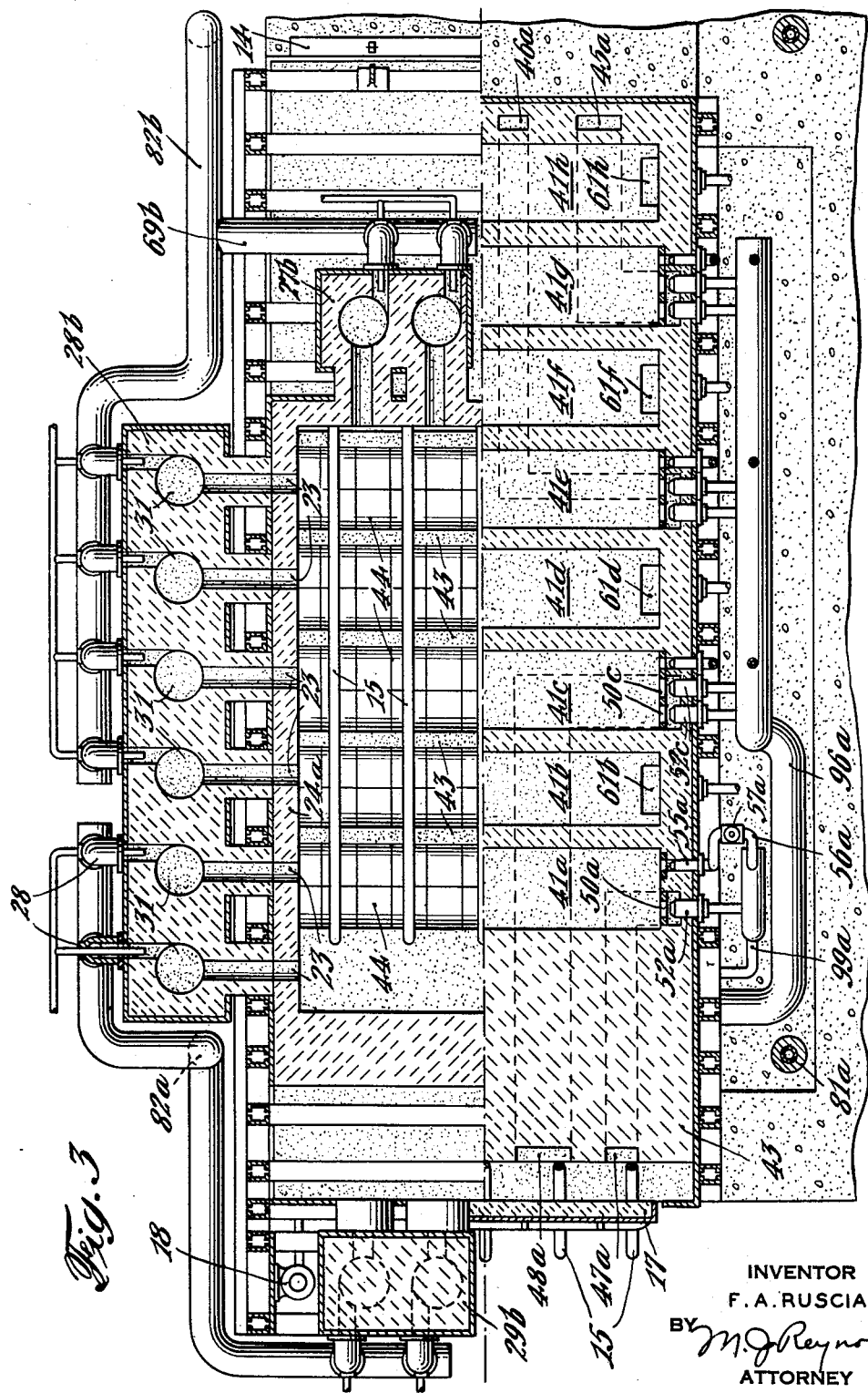
Fig. 3 is a horizontal sectional view on the offset line 3—3 of Fig. 2.

Referring first to Fig. 1, the furnace disclosed therein comprises a work heating chamber 10 having a preheating section 11 and a soaking section 12. The charging opening 13 is provided with a manually operable door 14 which normally is adjusted to a fixed opening just sufficient to permit entrance of the work W to be heated, which in the furnace illustrated is assumed to be billets, slabs, sheets or the like.

A series of water cooled rails 15 extend through the furnace and serve to support the work as it is pushed therethrough. In order to prevent chilling of the work while it is in the soaking section 12, these rails or skids are diverted through the refractory 16 forming the floor or hearth of this section. The furnace floor, at the discharge end of the furnace, is inclined sharply downward for the gravity discharge of the work as it is pushed off of the soaking hearth 12 on a continuation of the rails 15.

A hinged or swinging door 17 normally closes the discharge end of the furnace, the door being slotted to extend around the rails 15. The door 17 is operated to both open and closed position by an air cylinder 18 and inter-connecting linkage 19, as will more fully appear hereinafter.

Hot primary products of combustion are introduced into the heating chamber through ports 21 in the rear wall 22, ports 23 in each of the opposite side walls 24a, 24b and ports 25 in the front wall 26. These products are produced in two rear combustion chamber units 27a, 27b; two side units 28a, 28b; and two front units 29a and 29b; units 29a being shown only diagrammatically in Fig. 7. The side combustion chamber units 28a and 28b each comprise an elongated rectangular refractory body having a series of cylindrical chambers 31 therein (Figs. 2 and 3), one for each of the corresponding side ports 23. Fuel and air is supplied to the chamber by conduits 32 and 33 respectively, through a port 34, disposed tangentially with reference to the cylindrical chamber, at the upper end thereof, whereby the air-fuel mixture and the combustion products swirl about the chamber in scrubbing contact with the walls as they pass to the outlet port 23 disposed at the base of the cylinder. The individual combustion chambers of the units 27a, 27b, 29a and 29b are similarly supplied with fuel and air.

In order to carry out the main purpose of the invention of providing scale free heating at commercially feasible rates it is essential that the products of combustion entered into the work chamber be non-scaling in nature and that they be at relatively high temperature. The scale free character of the combustion products is obtained by employing a sufficient deficiency of air to produce combustion products in which both the $CO_2/CO$ ratio and the H₂O/H₂ ratio of the constituents are in equilibrium with the steel. The percent aeration required to produce such neutral combustion products is set forth fully in the copending application of F. A. Rusciano et al., Serial No. 347,716, filed April 9, 1953, and entitled Method and Apparatus for Producing Controlled Furnace Atmospheres. In general, the air supply must be reduced to approximately 50% of that required for complete combustion. Such a mixture is near the endothermic range and the resulting combustion is inherently slow and the temperature and heat release are low. Thus under normal combustion conditions combustion temperatures of approximately 2100° F. only are attainable with a heat release of from 30% to 40% of the available B. t. u. content of the fuel. Moreover, these rich mixtures react to completion, that is without the production of free carbon or soot, only with difficulty. It is for this reason that the relatively large number of small combustion chambers 31 have been provided. They function, first, to confine the products for an extended period to thus enable the slow acting reactions to be completed, secondly to provide extending scrubbing surface for the gases to obtain more intimate mixture thereof and to provide a hot ceramic catalytic surface to the gases to promote these reactions and lastly, due to the low radiation loss they permit these actions to occur at the maximum reaction temperature available from such a mixture. Moreover, in order, to further insure the completion of said reactions and to increase the temperature of the products entered into the heating chamber, the air supplied through the insulated conduits 33 is highly heated, as will hereinafter appear. It is desired to employ for this purpose, air which has been preheated to approximately 1000° F. The combustion products entered into the furnace, under these conditions will have a temperature between 2800° and 3000° F., and will thus serve both as a protective medium and an effective source of heat.

However, as indicated, these gaseous products still contain a very large amount of unreleased heat, that is, from 60% to 70% of the available heat of the fuel. In order that this heat may be utilized at the work, I have provided a plurality of secondary combustion chambers 41a to 41b, extending transversely of the furnace beneath the heating chamber 10. These chambers are formed by a floor 42, a plurality of transverse walls 43 and thin ached refractory slab roofs 44, the latter being composed of a material of good heat conductivity and high heat strength, such as silicon carbide. The rich gaseous atmosphere supplied to the heating chamber 10 is vented therefrom, primarily at each end of the chamber and, therefore, is caused to pass longitudinally through the furnace chamber in each direction so as to impart the heat to the work over a relatively long path of travel. Thus at the charging end of the furnace the lower rear wall 40 is provided with four downwardly extending vents such as 45a and 46a, shown in Fig. 3, and the forward sloping well, at the discharge end has four similar vents, such as 47a and 48a. These vents distribute the heating chamber gas to suitable burner ports provided for the various combustion chambers 41a to 41h. Thus vent 47a extends from adjacent the door 17, rearwardly through the floor 43 (Fig. 3) and thence laterally to and up the side wall 24b to a port 50a leading into the combustion chamber 41a. Similarly a vent 47b (Fig. 4) extends through the floor 43 rearwardly to a vertical portion 51 (Fig. 2) on the opposite side wall 24a which terminates opposite to the port 50b, extending into chamber 41b. The ports 50a and 50b are also provided with air jet nozzles 52a and 52b respectively, which supply air for effecting secondary combustion of the heating chamber exhaust gases within the chambers 41a and 41b.

Similarly vent 48a extends from adjacent the door 17 to a pair of inlet burner ports 50c of chamber 41c which in turn are provided with individual air jet nozzles 52c. The fourth front vent passage 48b likewise extends to a pair of burner ports for chamber 41d. Combustion chambers 41c to 41h are similarly provided with exhaust gas from the work chamber by vents 45a, 46a and 45b, 46b and with air through nozzles 52c to 52h.

All of the nozzles 52a to 52h are provided in suction producing relation to their associated exhaust gas supply vents and as a consequence the work chamber gases are forceably withdrawn from the work chamber. The movement of this gas through the charging and discharging passageways also effectively blocks entrance of contaminating air into the work chamber, even though one or both of these doors may be left open continuously. If desired, however, some intermediate venting of the furnace may be provided, as shown in Fig. 5, where a vent passage 53 is shown communicating directly between the work chamber 10 and a burner port 50c, also supplied with an induction air jet nozzle 52c. The air induction nozzles 52a to 52h are positioned adjacent the burner ports at such distance that when supplied with a sufficient amount of air to burn the vented gas to completion, they will produce a suction slightly greater than that required to maintain the heating chamber at the desired positive pressure. Therefore, in addition to the induction nozzles 52a to 52h, each combustion chamber is provided with non-suction producing nozzles 55a to 55h. Nozzles 52a and 55a are interconnected by a conduit 56a containing a manual valve 57a whereby a portion of the secondary air may be entered through the non-induction nozzle 55a. Similar connections are provided between each induction nozzle or pair of induction nozzles 52b to 52h and the associated non-induction nozzles 55b to 55h. Thus, by suitable adjustment of the manual valves 57a to 57h, the heating chamber pressure may be suitably regulated. It will be noted that alternate combustion chambers 41a to 41h are fired from opposite sides of the furnace, thereby providing substantially uniform side to side heating of the work in its passage through the furnace.

The air supplied to the secondary combustion chambers is also preferably heated. However, since the temperature of this secondary combustion is, inherently, relatively high only moderate heating, of the order of 300° to 500° F., of the secondary air is required. The heating of both the primary and secondary air is effected by the gas vented from the secondary combustion chambers in a manner to be described.

It will be recalled that the charging door 14 remains open throughout the operation of the furnace in order that the work pieces W may be introduced by the pusher mechanism, and that this door is adjusted to a height closely adjacent to the work so as to restrict to a minimum the open area at the charging end. Due to the suction produced in the vents 45a, 46a, 45b and 46b the major portion of the rich atmosphere passing through the preheat section 11 of the furnace is withdrawn, as stated, through these vents. However, in order to prevent leakage of this partially burned gas about the work and out of the charging end of the furnace, where it would burn in contact with the outer atmosphere, the charging passageway is extended for a substantial distance beyond the vents 45 and 46 and this passageway is provided transversely thereof with a perforated conduit 60 through which air is introduced into the passageway. This air will burn with the rich gas passing the vents 45, 46 and serve the dual function of providing heat for the cold work entering the furnace and producing a mass of completely combusted gas between the vents and the door opening so that any leakage occurring through the door opening will be of a combusted gas as distinguished from a combustible gas.

As previously stated it is desired to supply highly heated air, up to about 1000° F. to the primary combustion chambers 31 and moderately heated air to the secondary combustion chambers 41. The heat for this purpose is derived from the products of combustion vented from the secondary combustion chambers 41. Thus, each chamber 41a to 41h is provided with a downwardly extending vent 61a to 61h at the opposite ends thereof from the air injection nozzles 52a to 52h, as best shown in Figs. 2 and 3. These vents terminate in ports 62 which enter, along one side of the furnace into recuperating chambers 63a and 63b (Figs. 2 and 4) and along the opposite side of the furnace in similar chambers 64a and 64b. Thus vents 61b and 61d discharge into chamber 63a; vents 61f and 61h discharge into chamber 63b; vents 61a and 61c discharge into chamber 64a and vents 61e and 61g discharge into chamber 64b.

Included within each of the recuperating chambers 63 and 64 is a group of metallic conduits. Chambers 63a and 63b contain conduits 65a, 65b extending between inlet headers 66a, 66b and outlet headers 67a, 67b, respectively. Chambers 64a and 64b contain similar conduits connected between inlet headers 68a, 68b and outlet headers 69a, 69b, respectively, as shown diagrammatically in Fig. 7. Cold air, under suitable pressure is passed through the conduits 65a, 65b, etc., from the inlet headers to the outlet headers.

The combustion gases employed for heating the air in its passage through the recuperators, is cooled prior to entrance into the recuperating chambers by air supplied through nozzles 71. These nozzles as shown in Fig. 6 comprising a main conical nozzle position 72 having an outlet 73 disposed in suction producing relation to the port 62, and a central extended conduit section 74 having radial openings 75 disposed in non-suctional relation to the ports 62. Nozzle section 72 is provided with cooling air by a conduit 76 and section 74 is provided with air from conduit 76 through a manual valve 77 whereby the distribution of the air supplied by conduit 76 may be suitably regulated, thereby to maintain a suitable regulated suction in the discharge vents 61a to 61h. The function of the air is, of course, to cool the vented gas to a temperature, of the order of 2000° F. which will not be deleterious to the metal recuperating tubes.

The air passing through the recuperating tubes is preferably heated to a relatively high temperature and is supplied to the primary combustion chambers 31. The heated air from header 67a is thus supplied by an insulated conduit 81A (Fig. 7) to the front combustion chamber unit 29a and to the two forward chambers 31 of unit 28a. Header 67b supplies heated air by conduit 81b to the rear primary combustion chamber units 27a and the four rear chambers 31 of side unit 28a. The forward units 29b and two front chambers of side unit 28b are supplied by conduit 82a (Fig. 3) from header 69a and rear unit 27b and the four rear chambers of side unit 28b are supplied with heated air by conduit 82b from header 69b.

The moderately heated air for the secondary combustion chambers 41a to 41h is obtained from a low temperature recuperator 90, Figs. 1 and 4, disposed between the high temperature recuperators. This comprises a refractory chamber 91 containing a group of metallic tubes 92 supplied with cold air by a header 93 and feeding heated air into a header 94. A second air heating tube 95 also extends through the chamber 91. The header 94 has two outlet branches 96a and 96b (Fig. 4) the former of which supplies moderately heated air to the nozzles 52c 52e, 52g and 55c, 55e and 55g, and the latter of which supplies heated air to nozzles 52d, 52f, 52h and 55h. The single recuperative conduit supplies air heated to a somewhat lower temperature through branches 97a and 97b respectively, to nozzles 52a, 55a and 52b, 55b.

As shown in Fig. 4, the high temperature recuperative chambers 63a, 63b vent through passages 99a and 99b into the low temperature recuperator 90. The high temperature recuperators 64a and 64b similarly vent through chamber 90, the products of combustion finally passing to the stack through port 100 (Fig. 1).

From Fig. 7 it will be noted that the furnace is divided into two temperature controlled zones, the charging end zone comprising the four rear side primary combustion chambers of units 28a, 28b, the rear units 27a, 27b; the secondary combustion chambers 41b to 41h; the high temperature recuperators 63b, 64b which feed the above mentioned primary combustion chambers and the low temperature recuperative tubes 92 which feed the secondary combustion chambers 41c to 41h. This zone is controlled by a pyrometer 101 and control instrument 102 which selectively energizes and deenergizes electric valves 103, 104a, 104b, 105, 106a and 106b. Valve 103 is in the fuel line 32a feeding the primary combustion chambers of this zone, valves 104a and 104b control the primary air supply to recuperators 63b and 64b, which feed these primary combustion chambers, valve 105 controls the secondary air supply to recuperator tubes 93 and valves 106a, 106b control cooling air to the recuperator nozzle lines 76 of recuperators 63b and 64b.

The forward heat zone comprises the forward primary combustion chambers 29a, 29b, the two forward combustion chambers of size units 28a, 28b; the forward secondary combustion chambers 41a, 41b; the forward high temperature recuperator 63a, 64a; which feed the two forward primary combustion chambers of side units 28a, 28b; and the low temperature recuperator 90 which feeds the secondary combustion chambers 41a, 41b. These units are controlled by a pyrometer 107 and control instrument 108 which selectively energizes and deenergizes electric valve 109 in the fuel supply line 32b, valves 110a, 110b in the air lines supplying the high temperature recuperators 63a, 63b, respectively, valve 112 in the air line supplying the low temperature recuperator tube 90, and valves 113a, 113b, supplying cooling air to the recuperators 63a and 64a.

Thus the work passing through the work heating chamber is brought up to substantial full temperature in the charging end zone under control of pyrometer 101 and is maintained at such temperature as it continues through the discharging end zone under control of pyrometer 107.

The work is advanced through the furnace by any suitable pusher mechanism represented in Fig. 8 by the pusher element 115, the work W' to be entered into furnace being advanced into charging position on a roller conveyor 116. As previously stated the charging door 14 is held continuously open at a height just sufficient to admit the work pieces therebeneath. Although if desired it may be closed between each feeding operation. Contamination of the work heating atmosphere by outside air adjacent the charging end is not detrimental to the work since the work is cold at this point and therefore not subject to scaling. At the discharge end, however, where the work is up to heat it is desired to prevent any material influx of air into the discharge passageway and therefore the discharge door 17 is maintained closed except at the moment of discharge of a work piece. It is operated, as stated by an hydraulic cylinder 18 having a reversing valve 117 whereby pressurized fluid may be admitted to either end thereof to effect positive opening or closing of the door 17. The valve 117 is operated by a solenoid 118 under control of the pusher element 115 so that as each new work piece is entered into the furnace to thereby eject a heated piece the door 17 momentarily opens and thereafter immediately closes. For this purpose the pusher element 115 has a cam surface 119 adapted on forward movement thereof to close a switch 121 having a double set of contacts 122 and 123. Contacts 123 upon closure apply a battery to operate a dash pot relay 124 which simultaneously completes a circuit to solenoid 118 to effect opening of the door, and a circuit to relay 125. Relay 125 interrupts the circuit to the dash pot relay 124 and locks up through its left make contact. The release of relay 124 is thus timed independently of the continued forward and return movement of the pusher element and serves after a short operating period to interrupt the circuit to solenoid 118 and thus permit the door to reclose. Relay 125 remains locked until the pusher 115 returns fully to the right whereupon it releases and thus again prepares the operating circuit for dash pot relay 124, for operation on the next stroke of the pusher. The operation of the switch 121 at the beginning of the stroke of the pusher allows time for the door 17 to be fully opened before the pushing stroke is completed and a work piece is ejected and the timing of the dash pot relay is adjusted to effect closing immediately after the forward pusher stroke is completed. Thus the opening and closing of door 17 is accurately timed with relation to the ejection of a work piece and may be readily adjusted to the minimum open interval.

While I have shown and described what is considered to be the preferred embodiment of the invention, it is to be understood that numerous changes in construction and design coming within the scope of the appended claims may be made without departing from the essential attributes of the invention.

What I claim is:

1. A furnace for the scale-free heating of metal comprising a work heating chamber, a plurality of primary combustion chambers disposed about the periphery of said work heating chamber, means for supplying fuel and primary air to said primary combustion chambers, the rates of air to fuel being substantially less than that required for complete combustion, ports extending directly from said primary combustion chamber into said work heating chamber and distributed substantially uniformly about said periphery whereby said primary combustion products will pass into and form a gaseous atmosphere in said work heating chamber, a plurality of secondary combustion chambers disposed beneath said work heating chamber and separated therefrom by refractory walls composed of a material having relatively good heat conductivity, means for venting the atmosphere from said work heating chamber to said secondary combustion chambers, means for supplying supplemental air to secondary combustion chambers in an amount to support secondary combustion of said vented atmosphere, means for exhausting said secondary combustion products from said secondary combustion chambers, and means for passing said primary and supplemental air in heat transfer relation to said exhausted secondary combustion products.

2. A furnace constructed in accordance with claim 1 in which said primary combustion chambers substantially blanket the side walls of said work heating chamber, whereby to restrict heat radiation losses from both said work heating chamber and said primary combustion chambers.

3. A furnace for the scale-free heating of metal comprising a work heating chamber, means for supplying to said work heating chamber the primary products of combustion of fuel and primary air in which the ratio of fuel to air is substantially less than that required for complete combustion, whereby to form a non-scaling gaseous atmosphere in said work heating chamber, a plurality of transverse work supporting walls extending beneath said work heating chamber, a plurality of secondary combustion chambers disposed between said transverse walls and separated from said work heating chamber by refractory partitions composed of a material having relatively good heat conductivity, means for venting the atmosphere from said work chamber to said secondary combustion chambers, means for supplying supplemental air to said secondary combustion chambers in an amount to support secondary combustion of said vented atmosphere, means for exhausting said secondary products from said secondary combustion chambers, and means for passing said primary and secondary air in heat transfer relation to said exhausted secondary combustion products.

4. A furnace constructed in accordance with claim 3 in which said refractory partitions comprise thin slabs forming the roof of said secondary combustion chambers.

5. A furnace for the scale-free heating of metal comprising a work heating chamber, means for supplying to said work heating chamber the products of a primary combustion of fuel and air in which the ratio of air to fuel is substantially less than that required for complete combustion, whereby to form a non-scaling gaseous atmosphere in said work heating chamber, a plurality of secondary combustion chambers disposed beneath said work heating chamber and separated therefrom by refractory partitions composed of a material having relatively good heat conductivity, means for venting the atmosphere from said work heating chamber to said secondary combustion chambers, means for supplying supplemental air to said secondary combustion chambers in an amount to support secondary combustion of said vented atmosphere, a heat recuperator extending beneath said secondary combustion chambers, means for passing said primary air through said recuperator, and exhaust passageways extending from said secondary combustion chambers to said recuperator whereby said secondary reaction products are passed in heat conducting relationship to said primary air and a second recuperator for said secondary air, means for passing secondary air through said second recuperator and means for venting the secondary combustion products from said first mentioned recuperator and passing the same through said second recuperator in heat transfer relation to said secondary air.

6. A furnace constructed in accordance with claim 5 including means for supplying cooling air to said exhaust passageways for addition to the secondary products of combustion before they are brought into heat transfer relation with said primary air, said cooling air being supplied at least in part in suction producing relation to said exhaust passageways.

References Cited in the file of this patent

UNITED STATES PATENTS

| | | |
|---|---|---|
| 1,339,190 | Fuller | May 4, 1920 |
| 1,835,677 | Stein | Dec. 8, 1931 |
| 1,921,592 | Talley | Aug. 8, 1933 |
| 2,157,221 | Spencer et al. | May 9, 1939 |
| 2,233,474 | Dreffein | Mar. 4, 1941 |